United States Patent
Witkop

(10) Patent No.: US 8,639,839 B1
(45) Date of Patent: Jan. 28, 2014

(54) ROUTING COMPONENT QUALITY ASSURANCE

(75) Inventor: Erik Michael Witkop, Londonderry, NH (US)

(73) Assignee: Sprint Communications Company L.P., Overland Park, KS (US)

( * ) Notice: Subject to any disclaimer, the term of this patent is extended or adjusted under 35 U.S.C. 154(b) by 2273 days.

(21) Appl. No.: 11/212,149

(22) Filed: Aug. 26, 2005

(51) Int. Cl.
*G06F 15/16* (2006.01)

(52) U.S. Cl.
USPC ........... 709/237; 709/230; 709/220; 709/221; 709/245

(58) Field of Classification Search
USPC .......................... 709/237, 230, 220, 221, 245
See application file for complete search history.

(56) References Cited

U.S. PATENT DOCUMENTS

| | | | |
|---|---|---|---|
| 6,098,098 A * | 8/2000 | Sandahl et al. | 709/221 |
| 6,477,683 B1 * | 11/2002 | Killian et al. | 716/1 |
| 6,571,358 B1 * | 5/2003 | Culotta et al. | 714/33 |
| 7,222,269 B2 * | 5/2007 | Kurinami et al. | 714/47 |
| 7,340,166 B1 * | 3/2008 | Sylvester et al. | 398/45 |
| 2004/0204887 A1 * | 10/2004 | Klinck | 702/108 |
| 2004/0249916 A1 * | 12/2004 | Graves et al. | 709/223 |
| 2007/0044156 A1 * | 2/2007 | Redmann | 726/25 |
| 2007/0180495 A1 * | 8/2007 | Hardjono et al. | 726/3 |

\* cited by examiner

*Primary Examiner* — Lan-Dai T Truong

(57) ABSTRACT

A method, a computer-readable media and a user interface are provided for ensuring, without user interaction, that a communications network contains properly configured routing components. A set of commands are executed to receive a routing component's current configuration. A benchmark configuration is provided that contains the desired configuration for the routing component. The set of parameters of the routing component's current configuration are automatically compared to the benchmark set of parameters in order to determine if differences exist. The results of the comparison process are then presented.

9 Claims, 8 Drawing Sheets

ROUTER QA REPORT

600

Submitted on 08/22/05_08:14:19 AM EST by user: ewitkop

612 ⟵ 610

QA Report for: boston-dartmouth-ip.bain.com

614 {

IOS Version is c3745-i-mz.122-8.T10.bin .......CHECK
The router config has the first bandwidth statement as ' bandwidth 12000 ' and you have 1 bandwidth statement(s)......CHECK
The router has the correct voyence snmp statement............OK
Running config saved to NVRAM.............OK
The router is taking CRC Errors, NOT OK to cutover. Please clear the counters and retest in 10 minutes..............FAIL
Last clearing of "show interface" counters 1w4d ⟶ 614A
The router is logging to x.x.x.20 or x.x.x.22 on the MRN.............OK
The router has 'service password-encryption' setup correctly............OK
The router has 'config-register 0x2102 or 0x102'.............OK
The router does not have 'logging console' on .............OK
The router has an enable secret.............OK
The router has at least 1 bandwidth statement in the config.............OK
The router has access-class 95, 98 or 99 on the vty.............OK
The router has a tacacs command for server .41 and it is first in order.............OK
The router has a tacacs command for server .43 and it is second in order.............OK
The router does not have 'ip http server' on.............OK
The router does not have a CON,AUX or VTY password on.............OK
The router does not have 'exec-timeout 0 0' on CON,AUX or VTY.............OK
The router does not have 'privilege level 15' on the CON,AUX, or VTY.............OK
The router does not have a 'line vty 5 15'.............OK
The router has 2 spectrum snmp traps setup correctly.............OK
The router has FMS, PL, CKT, Circuit,circuit,cct,Ckt,ckt,OE,oe or NVCID in your WAN desc.............OK
You do not have debug on.............OK
CPU utilization for five seconds: 41%/2%; one minute: 14%; five minutes: 4%

616 { APPROVED IOS SECTION
IOS IS NOT APPROVED, please visit http://vamnsdb01/ios/index.cfm .......CHECK
⟵ 618

ODIE SECTION
The ODIE model type matches the router model. Odie has 3745 and the router is 3745.

Service Type Checks for sprintlink_ip
The router has one of the correct community string for MRN.............OK
The router service is sprintlink and does not have a NTP server in config.............OK
The router has 4 source-interface commands setup correctly.............OK
The router has snmp-server trap-source setup correctly.............OK

DBU SECTION

620 { FINAL REPORT
QA FAILED. NOT OK TO CUTOVER, PLEASE FIX AND RETEST. Verify your Service Type Radio button selection,also.
PLEASE LOG YOUR QA FAILURE HERE: http://199.11.1.6/qa-flags/email-qa.html

FIG. 6

ROUTING COMPONENT QUALITY ASSURANCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A communications network is composed of many devices that are interconnected so that information can be communicated from a source to a destination. A common element of a communications network is a routing component. A routing component helps determine where and how to direct data across a communications network. A routing component is an integral part of a network and a routing component's security is a vital part of the overall security for the networks they serve. To maintain a high level of productivity in a communications network, routing components need to be properly configured and should be secure.

An improperly configured routing component can lead to various security problems in its network or other networks with which it communicates. An improperly configured routing component can result in misdirected traffic, reduced performance, a denial of communications services, exposure to sensitive data, exposure of network configuration details, attacks against other network components, a reduction in overall security of an entire enclave, exposure of internal network components to scans and attacks, and undetected attacks.

Attempting to check that a routing component is properly configured is currently time and resource intensive. A routing component may contain tens of parameters or even more. Attempting to check these parameters manually is subject to human error. A human may misinterpret the output, unintentionally skip a line, or not even realize the existence of an error, which can be devastating to a network.

The current state of the art could be improved by providing, among other things, a method and system that allows the current configuration of the routing component to be automatically checked and compared against a defined benchmark configuration without user interaction. Moreover, a method is needed to allow a set of one or more commands to be run that automatically identify any differences between a given configuration and a benchmark configuration.

SUMMARY

The present invention solves at least the above problems by providing a method for determining whether the configuration of a routing component is correct in some embodiments. The present invention has several practical applications in the technical arts, not limited to automatically retrieving the current configuration of a routing component, enabling the current configuration of the routing component compared with a benchmark set of parameters, and indicating any differences between said retrieved set of parameters and said benchmark set of parameters.

In a first exemplary aspect, a method is provided for ensuring that data is properly routed through a communications network. Without user intervention, confirming that a set of routing components within the communications network is properly configured; determining the routing component to test; querying the identified routing component; retrieving a set of parameters of the routing component; comparing the retrieved set of parameters against a benchmark set of parameters; indicating any differences between the retrieved set of parameters and the benchmark set of parameters; and repeating these steps for as many routing components that are in the set.

In a second aspect, a computer-program product is provided for performing a method without user interaction for ensuring that a routing component is properly configured in a communications network. The method includes providing a reference data set containing routing-component parameters; retrieving a configuration that comprises current parameters from a set of one or more routing components in the network; comparing the first data set with the second data set and automatically identifying differences between the first data set and the second data set.

In a final illustrative aspect, a user interface embodied on one or more computer-readable media for evaluating data in a communications network is provided. The user interface includes a first screen that allows a user to indicate a set of one or more routing components having configuration parameters to be checked. The user interface also includes a second screen that presents comparison data that reflects differences between a retrieved set of parameters and a benchmark set of parameters.

BRIEF DESCRIPTION OF THE SEVERAL VIEWS OF THE DRAWINGS

The present invention is described in detail below with reference to the attached drawing figures, which are incorporated by reference herein and wherein:

FIG. 6 depicts an exemplary depiction of an illustrative report that can be presented.

DETAILED DESCRIPTION

Figure 1:
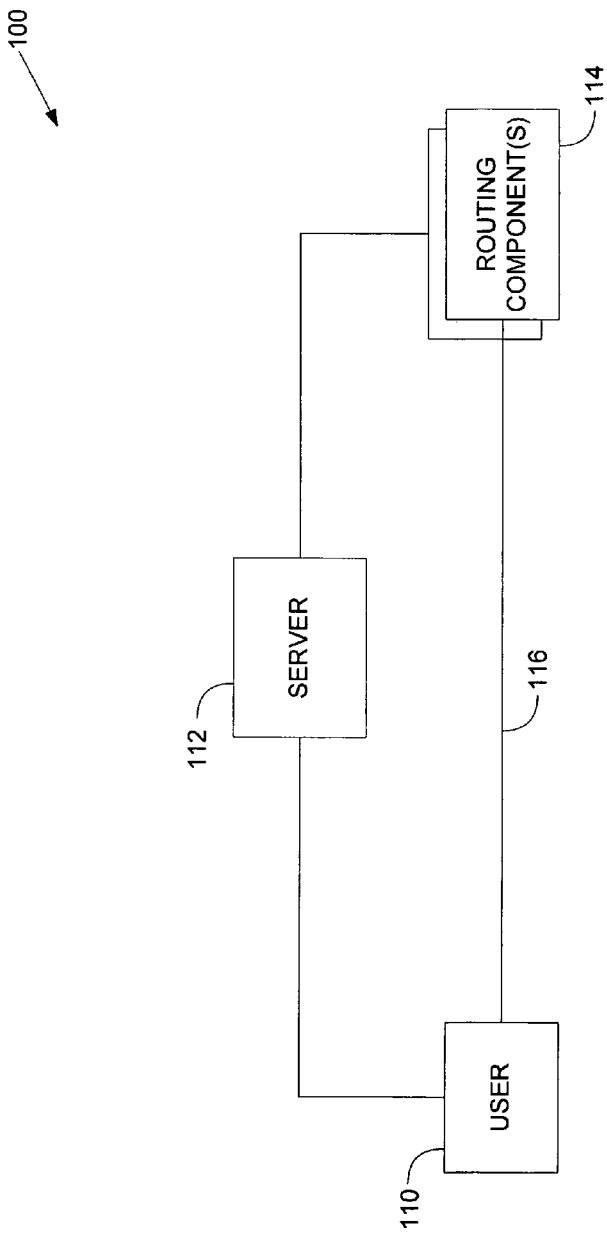
FIG. 1 is a block diagram depicting an illustrative operating environment suitable for practicing an embodiment of the present invention.

An embodiment of the present invention provides, among other things, a method for quality assuring a routing component in a communications network. The present invention can be used, for example, to regulate routing-component configurations, reduce the time that has historically been associated with regulating routing-component configurations, and verify the current status of the routing component's configuration. As will be described in greater detail below, the present invention offers the ability to automatically submit multiple verification commands, parse the returned data, and identify any differences without user interaction.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, gateways, workstations, and other machines may be connected to one another across a communications medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

Referring now to FIG. 1, a block diagram illustrating an operating environment suitable for practicing an embodiment of the present invention is provided. Each of the aspects depicted in FIG. 1 will be explained in detail below. The reference numerals of FIG. 1 are numbered to correspond to the figures that discuss the various elements in greater detail. The following comments are introductory in nature and intended to help provide a high-level overview of certain aspects of the present invention. Because of the high level of abstraction depicted in FIG. 1, it should not be construed as limiting in nature. That is, the elements, relationships, and flows of FIG. 1 are illustrative in nature and should not be construed as limitations of the present invention.

As illustrated, the communications network comprises a user 110 which may be or make use of a personal computer, workstation, or other device capable of communicating with a server 112 or directly with one or more routing components 114. In an alternative embodiment, the number of users in communication with a server may vary. In one embodiment, server 112 is responsible for determining the current configuration of a routing component and comparing the current configuration of the routing component against a benchmark configuration. However, in another embodiment, user 110 may initiate a set of commands directly to routing component(s) 114 via pathway 116.

Server 112, by way of example, may be one of a myriad of types of computing devices. In alternative embodiments, the number of servers in communication with each user may vary. Routing component(s) 114 may, by way of example, be a router which is available by entities such as Nortel Networks; Cisco Systems, Inc.; and the like. However, in embodiments of the present invention, routing components are not limited to a particular type of hardware. In alternative embodiments, the number of routing components in communication with each server may vary. Functionality offered by each of these modules will now be explained in greater detail.

Figure 2:
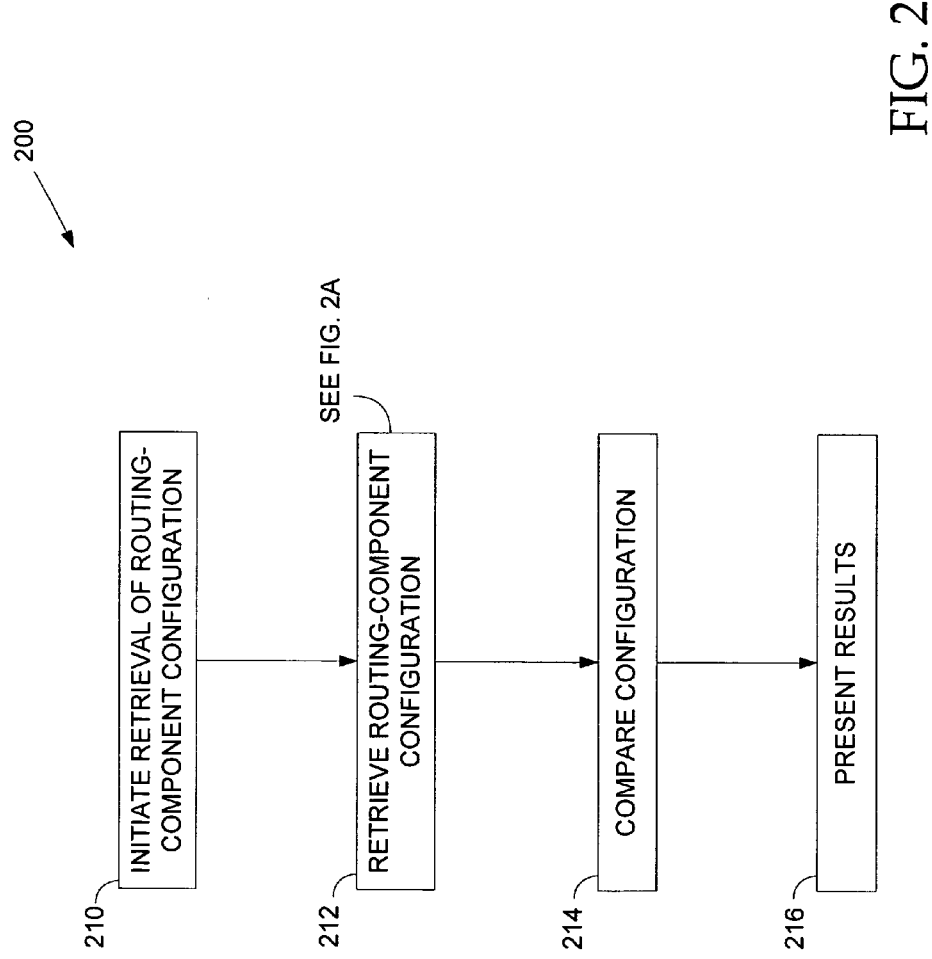
FIG. 2 is a high-level flowchart depicting a method in accordance with an embodiment of the present invention.

Turning now to FIG. 2, a method is depicted in accordance with an embodiment of the present invention for ensuring the proper configuration of a routing component and is referenced generally by the numeral 200. The implementation of the described embodiment allows user 110 to determine the current configuration of one or more routing components 114. The configuration is then automatically compared against a benchmark configuration.

As illustratively shown, initiation of the retrieval of the routing component's configuration occurs at step 210. At a step 212, the configuration associated with routing component 114 is retrieved. At a step 214, retrieved configuration is compared against a benchmark configuration. Finally, the results are presented at a step 216.

It should be appreciated that the following more detailed description is illustrative in nature, and while different steps, processes, and pseudocode depictions are provided, they are done so in an exemplary fashion to explain the present invention. Not all steps are depicted so as not to obscure the present invention. Similarly, some steps depicted by distinct boxes may be collapsed and carried out as a single process or in parallel with other processes as would be apparent to one of ordinary skill in the relevant art.

Figure 2A:
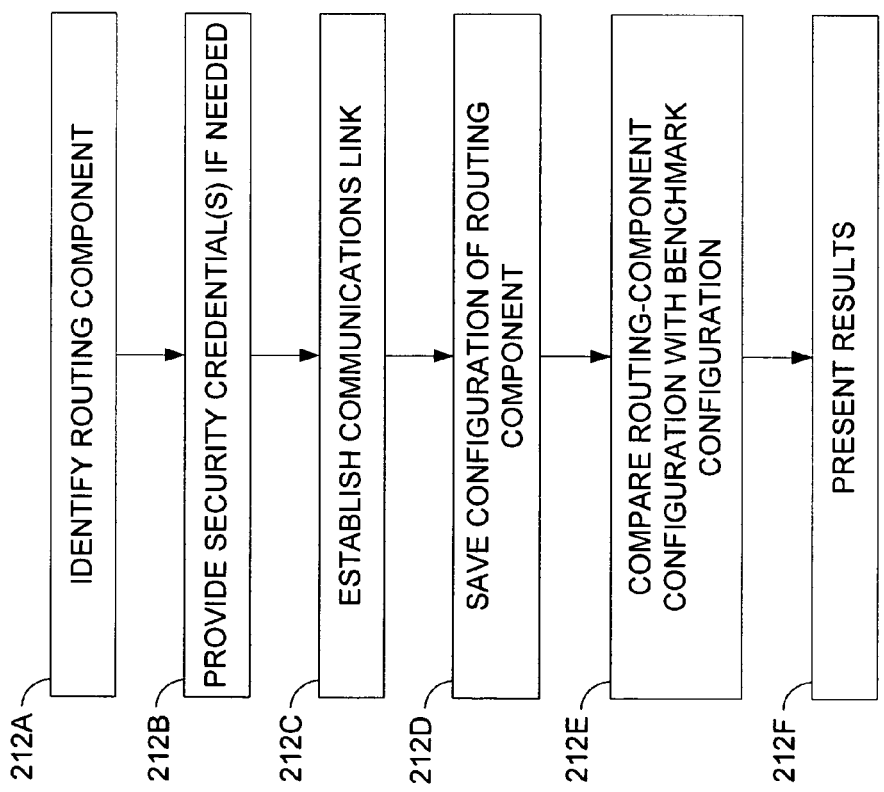
FIG. 2A is a high-level flowchart illustrating the retrieval of the routing component's configuration in accordance with an embodiment of the present invention.

Referring now to FIG. 2A, a flowchart illustrating the retrieval of the routing component's configuration in accordance with an embodiment of the present invention is referenced generally by the numeral 200. At a step 212A, user 110 provides a set of steps for identifying the routing component. The exemplary input for the identification includes the name or address, such as an IP address, of the routing component to be checked. In one embodiment, the following indications are established: device name, selecting service type (e.g. CPE-Based VPN, frame relay, ATM, NVPN/PIP/GMPLS VPN, IP, ISD DBU, custom account QA's, telnet, SSH, special RW community string). In an embodiment, service type may also be known by other names, such as transport type. The device name is the name of the routing component that the user desires to check the configuration of, which in this case is routing component 114. The device name may also be placed in a command line. Selecting the service type indicates the various checks that will be implemented for routing component(s) 114. A more detailed explanation of illustrative types of checks will be discussed later.

At a step 212B, user 110 may provide a set of security credentials if increased security is desired. Exemplary security credentials include a username and a password. In embodiments of the present invention, the following security credentials are established: TACACS (Terminal Access Controller Access Control System) username and password. Thus, a username, password, or other security credentials are provided to gain access to the configuration of a routing component in an embodiment.

At a step 212C, user 110 establishes a communications link with routing component(s) 114. In one embodiment, a communications link is established by user 110 to the desired routing component by way of remote access via Telnet (discussed below).

Figure 3:
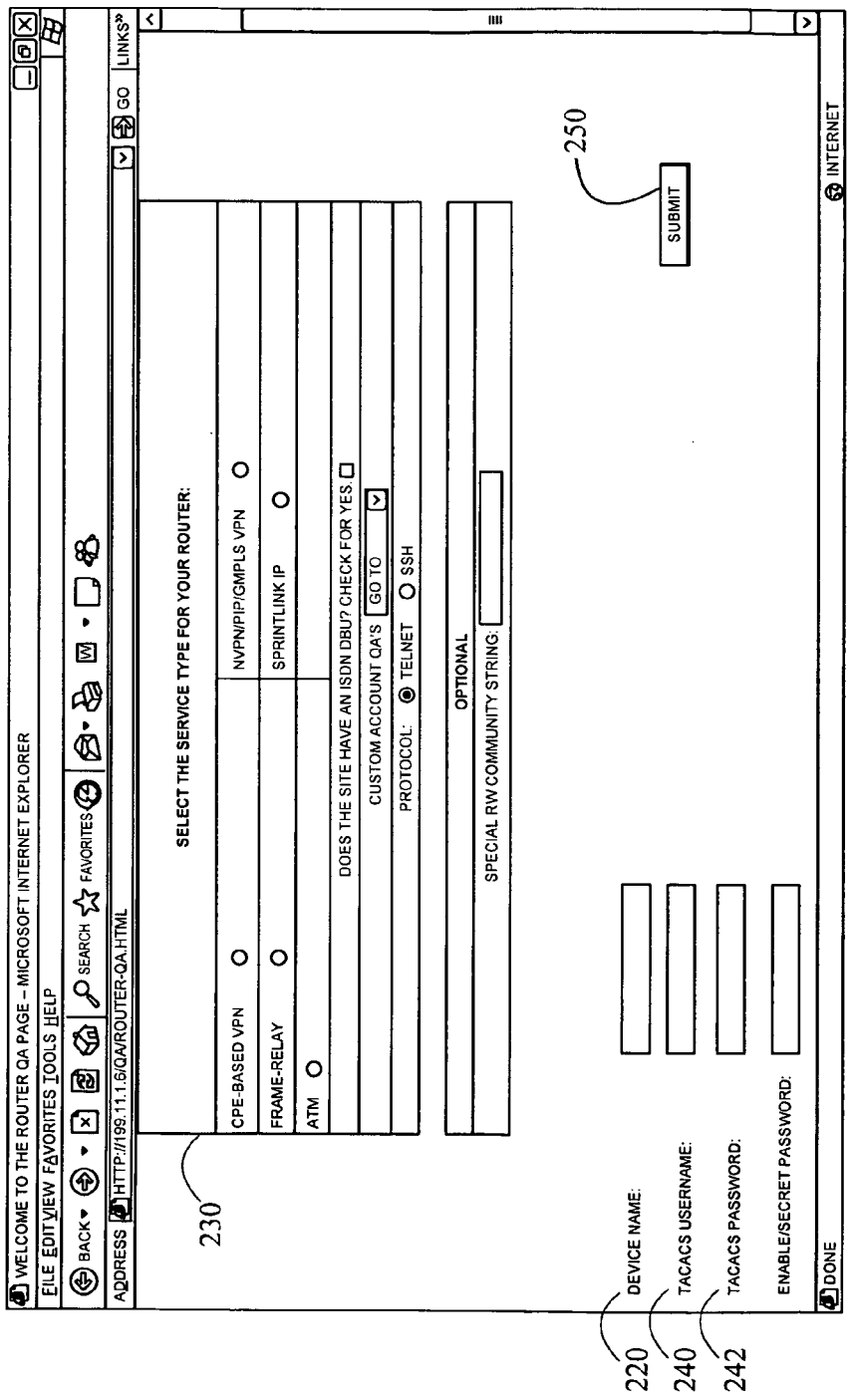
FIG. 3 depicts an exemplary screenshot of a user interface in accordance with an embodiment of the present invention that illustrates various functional aspects of the present invention.

FIG. 3 depicts an exemplary screenshot of a user interface in accordance with an embodiment of the present invention that illustrates various functional aspects of the present invention. Steps 212A-212C may be completed in connection with presentation on a network browser, including a Web browser, ("browser"). The browser presents the user with a form containing dialog boxes requesting information. Information may include the desired routing component, security credentials, and service type. In embodiments of the present invention, forms are processed by CGI scripts. CGI (Common Gateway Interface) is a standardized way of sending information between a server and a processing script. CGI is just one illustrative programming language that may be used to facilitate the script. In embodiments of the present invention, the programming language for the CGI script is PERL (Practical Extraction and Report Language), but other programming languages can also be used.

In embodiments of the present invention, a button labeled "submit" is provided on a browser. By pressing "submit," the browser establishes a communications link with the routing component by launching a script. As stated above, in embodiments of the present invention, the programming language for the script is PERL which in turn uses EXPECT, an illustrative programming language.

EXPECT is an interactive program used to control interactive applications such as Telnet. EXPECT prompts and expects a user to enter keystrokes in response, however, in the described embodiment a simple EXPECT script is written to automate these interactions allowing the EXPECT program to run the interactive program non interactively. EXPECT establishes remote access with the routing component by way of Telnet. Telnet enables terminal process-oriented processes to communicate and is utilized to remote log in, but such a communications session should not be construed as a limitation of the present invention. In an alternative embodiment, establishing remote access with a routing component may be accomplished by using SNMP (Signaling Network Management Protocol) and various protocols such as the file transfer protocol (FTP), Secure Shell, or a variant of the internet protocol (IP).

At a step 212D, the configuration of the routing component is saved. In embodiments of the present invention, this may be accomplished by the script sending a command to the routing component (e.g. "write memory").

At a step 212E, the server automatically compares the current routing component's configuration with a benchmark configuration. The comparison may also be done locally at the workstation of user 110. In an embodiment, the configuration of the routing component includes a set of one or more parameters. The current set of one or more routing-component parameters is automatically compared with a benchmark configuration that contains a desired set of one or more parameters. This process is described in detail below, with reference to FIG. 5. At a step 212F, results of the comparison are automatically presented.

Figure 4:
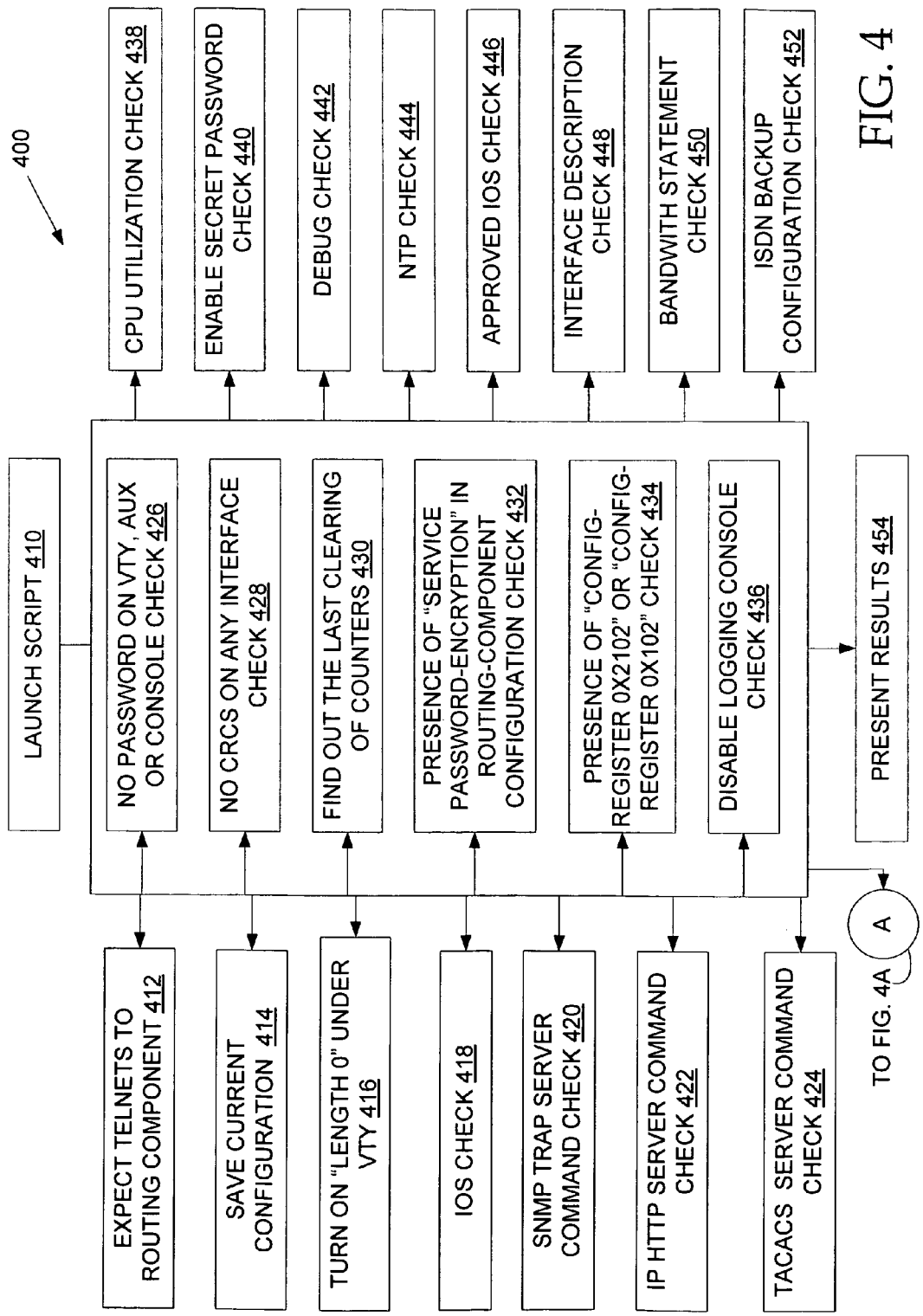
FIG. 4 provides a more detailed flowchart illustrating the retrieval of the routing-component's configuration in accordance with an embodiment of the present invention.
Figure 4A:
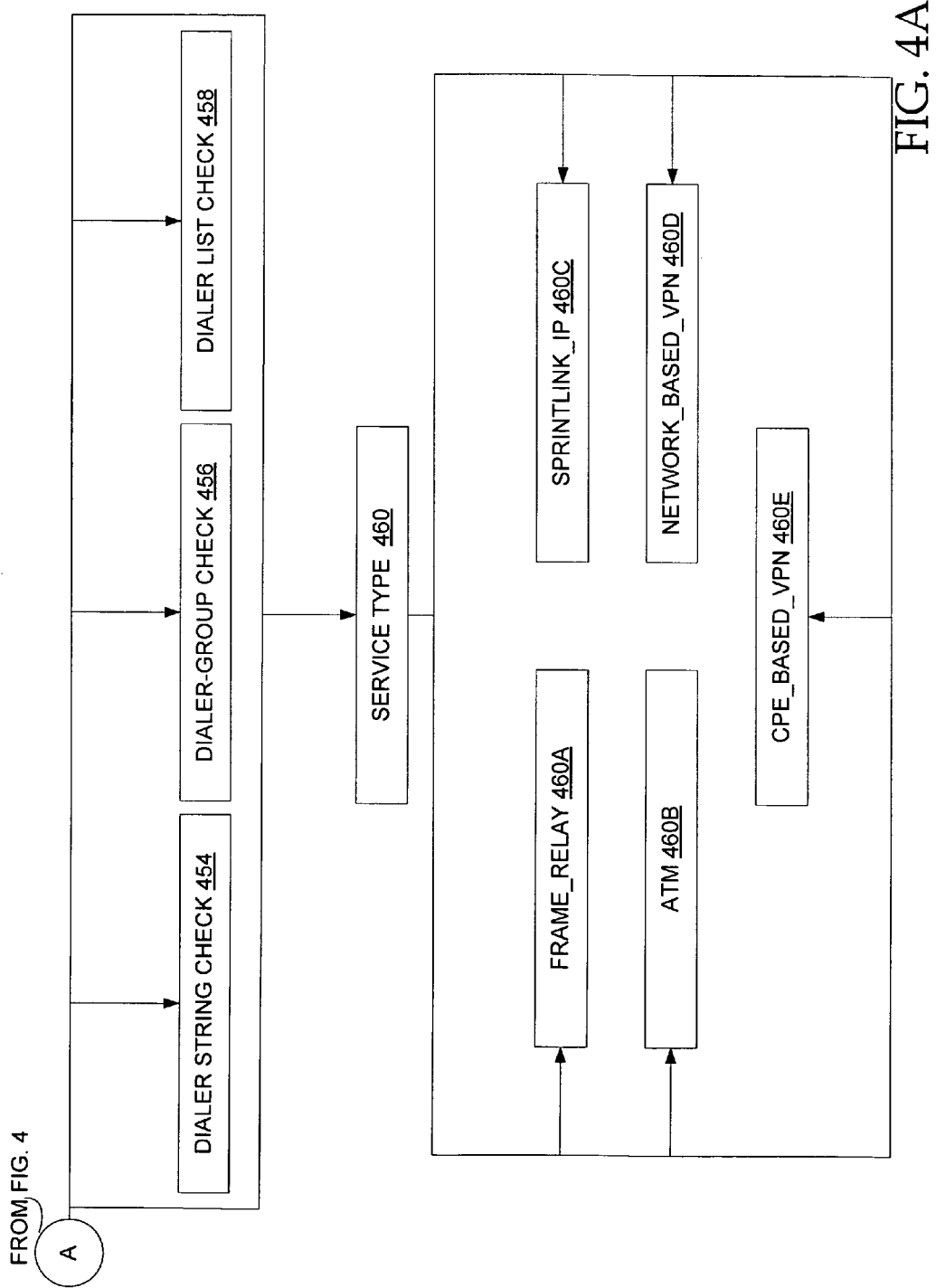
FIG. 4A provides a more detailed flowchart illustrating the retrieval of the routing-component's configuration in accordance with an embodiment of the present invention.

FIG. 4 and FIG. 4A provide a more detailed flowchart illustrating the retrieval of a routing component's configuration in accordance with an embodiment of the present invention and is referenced generally by the numeral 400. At a step 410, a browser launches a script as discussed above. The script contains a list of commands to be run. Exemplary steps are provided in FIG. 4 and FIG. 4A. In embodiments of the present invention, commands within these steps are performed without user interaction. The number of commands may vary and the types of commands are not limited to those within the steps listed in FIG. 4 and FIG. 4A. Each command is explained in detail below and in no specific order. Steps 412-458 contain global commands, meaning that these commands are implemented on all service types. Steps 460A-460E contain commands that are for particular service types, which can be selected via the browser as depicted in FIG. 3.

At a step 412, the use of EXPECT to Telnet to routing component 114 may be instructed. After logging on, user 110 gains remote access to routing component 114.

At a step 414, the configuration of routing component 114 may be saved. In an illustrative embodiment, this may be accomplished by issuing a "write memory" command or equivalent. Maintaining current backups of routing component 114 configuration is essential for quick and reliable recovery from security compromises or simple hardware failures. In the case of security compromise, it is desirable to preserve the evidence, so that it may be used in a forensic investigation or even prosecution. Saving the current configuration of routing component 114 assures that the permanent routing-component configuration is quality assured and is not a temporary configuration. Changes made to a running configuration usually occur only in RAM and generally take effect immediately; consequently, these changes are lost upon reboot. Changes made in NVRAM are not lost upon reboot.

At a step 416, a concatenate behavior may be created. In an illustrative embodiment, this may be accomplished by issuing a "length 0" command or equivalent. This creates a concatenate behavior on a Telnet session. The script requires that routing component 114 outputs its response all at once, rather than requiring user input to continue. Without issuing this command, EXPECT would not know when to strike the spacebar for the input to continue, however with this concatenate behavior all of the outputs are displayed at once.

At a step 418, the IOS (Internal Operating System) may be checked. In an illustrative embodiment, this may be accomplished by issuing a "sho ver" command or equivalent. The command "sho ver" grabs the file name, but more specifically it strips off the end of the string and prints the remaining string which contains the file name.

At a step 420, the presence of a logging command in routing component 114 may be checked. In an illustrative embodiment, this may be accomplished by issuing an "SNMP-server host" command or equivalent. Routing components 114 may have the ability to report certain events as SNMP traps. While only a small subset of all log messages may be reported this way, it may be useful in a network that already has SNMP management deployed.

At a step 422, routing component 114 may be secured from an unwanted reboot. In an illustrative embodiment, this may be accomplished by issuing an "ip http server" command or equivalent. If this command is enabled on routing component 114, a hacker could send a particular URL string to the routing component and cause it to reboot.

At a step 424, servers in the configuration of routing component 114 may be checked. In an illustrative embodiment, this may be accomplished by issuing a "tacacs-server host" command or equivalent. TACACS is a third-party authentication server, therefore, each routing component 114 must have two commands pointing to the servers for authentication. Without the presence of these two commands one would be unable to authenticate into the routing component.

At a step 426, the presence of passwords in the configuration of routing component 114 may be checked. In an illustrative embodiment, this may be accomplished by issuing a "begin line con" command or equivalent. The "begin line con" command checks to ensure that there are no passwords on the VTY, AUX, or CONSOLE. With TACACS enabled, there is no need for these passwords. Their presence actually weakens the overall security of the device as these passwords are easily cracked with the right software tools.

At a step 428, the presence of CRCs (Cyclic Redundancy Check) in the configuration of routing component 114 may be checked. In an illustrative embodiment, this may be accomplished by issuing a "CRC" command or equivalent.

At a step 430, the last clearing of the counter in the configuration of routing component 114 may be checked. In an illustrative embodiment, this may be accomplished by issuing a "counter" command or equivalent. The last clearing of the counters are checked to make sure that CRC capture is relative to the last time the counters were cleared.

At a step 432, the presence of encrypted passwords in the configuration of routing component 114 may be checked. In an illustrative embodiment, this may be accomplished by issuing a "service password-encryption" command or equivalent Without this command in routing component 114, each password is plain text readable. It is a security violation to leave passwords in the plain text. With this command present, routing component 114 encrypts each password in the configuration.

At a step 434, the firmware in the configuration of routing component 114 may be checked. In an illustrative embodiment, this may be accomplished by issuing a "config-register-0x2102" or "config-register 0x102" command or equivalent. The "config-register 0x2102" or "config-register 0x102" command checks to ensure that the firmware is set to reboot from the configuration at power on.

At a step 436, the logging in the configuration of routing component 114 may be checked. In an illustrative embodiment, this may be accomplished by issuing a "console logging" command or equivalent. The "console logging" command checks to ensure that logging is not left on for the console. If logging is left on, the modem may "hang" and become unusable.

At a step 438, the CPU in the configuration of routing component 114 may be checked. In an illustrative embodiment, this may be accomplished by issuing a "five" command or equivalent. The "five" command checks to ensure the CPU utilization in not too high.

At a step 440, the security of a password in the configuration of routing component 114 may be checked. In an illustrative embodiment, this may be accomplished by issuing a "secret" command or equivalent. The "secret" command checks to ensure that routing component 114 has an enabled secret password on it. This is the main password to administer routing component 114 and it comes in two different types, enable and enable secret. The enable password is easily cracked, as the enable secret is not. Therefore, for security purposes enable secret needs to be used.

At a step 442, the debugging command in the configuration of routing component 114 may be checked. In an illustrative embodiment, this may be accomplished by issuing a "secret" command or equivalent. The "debug" command checks to ensure that Debug is not on. Debug is for diagnostic purposes only and may adversely affect performance of routing component 114.

At a step 444, the source from where routing component 114 receives its time may be checked. In an illustrative embodiment, this may be accomplished by issuing a "ntp serv" command or equivalent. The "ntp serv" command checks to ensure that routing component 114 receives its time from a Network Time Protocol server. In order for routing component 114 to communicate with the NTP server, the command "ntp server" needs to be present in routing component 114.

At a step 446, the IOS of routing component 114 may be checked against approved IOSs. In an illustrative embodiment, this may be accomplished by taking the IOS that is running and verifying it against a mysql database to see that the image name is valid for a particular account name. Next, the filename that was in the output in step 418 is queried against the mysq 1.

At a step 448, the circuit identifier of routing component 114 may be checked. In an illustrative embodiment, this may be accomplished by issuing a "desc" command or equivalent. The "desc" command checks to ensure routing component 114 has a circuit identifier in the WAN port description.

At a step 450, the bandwidth statement on routing component 114 may be checked. In an illustrative embodiment, this may be accomplished by issuing a "bandwid" command or equivalent. The "bandwid" command checks to ensure that routing component 114 has a bandwidth statement on at least one interface. This is very important for bandwidth utilization reports which are obtained through SNMP. When the command is missing from the configuration, the configuration reverts back to the default, which on a serial port is 1544 (TI speed), but routing component 114 may not have a full T1, it may just have 128 k. In this example, a utilization report would think that a fully utilized WAN link would be 1544 when in actuality it is only 128 k.

At a step 452, the basic line configuration on routing component 114 may be checked. In an illustrative embodiment, this may be accomplished by issuing a "dialer" command or equivalent. The "dialer" command checks to ensure that the basic command line configuration is in place if routing component 114 were to have an ISDN (Integrated Services Digital Network) backup configuration on it. Domestically, all ISDN lines have at least one SPID (Service Profile Identifier), therefore, the "spid" command checks to ensure there is at least one SPID present in routing component 114's configuration.

Finally, the presence of three other global commands are checked: command 454, "dialer string," command 456 "dialer-group," and command 458, "dialer-list."

At a step 454, the dialer string in the configuration of routing component 114 may be checked. In an illustrative embodiment, this may be accomplished by issuing a "dialer string" command or equivalent. The "dialer string" command enables one to make phone calls.

At a step 456, the dialer group in the configuration of routing component 114 may be checked. In an illustrative embodiment, this may be accomplished by issuing a "dialer-group" command or equivalent. The "dialer-group" command informs the routing component what interface to use to dial out.

At a step 458, the dialer list in the configuration of routing component 114 may be checked. In an illustrative embodiment, this may be accomplished by issuing a "dialer-list" command or equivalent. The "dialer-list" command informs the routing component what packets should trigger the phone call.

At a step 460A, the overall status of routing component 114 may be checked. In an illustrative embodiment, this may be accomplished by issuing a "service specific community string" command or equivalent. The "service specific community string," command is for the service type FRAME_R-ELAY.

At steps 460B-460E, the overall status of routing component 114 may be checked. In an illustrative embodiment, this may be accomplished by issuing a "service specific community string" command or equivalent. The "service specific community string," command is for the service types ATM, SPRINTLINK_IP, CPE_BASED_VPN, and NETWORK_BASED_VPN respectively. The overall status of both the hardware and the software is checked. If an interface is unplugged or routing component 114 explodes, this command will detect such an event.

Syntax rules for various languages should be observed. For example, haphazard use of the pound sign (#) may cause errors after a routing component command, EXPECT knows to stop when it processes a router prompt (#). For example, if a pound sign were in a community string that was the first one in a list, EXPECT would not look at the rest of the strings, and an error message would be displayed stating that the proper string was not available.

Figure 5:
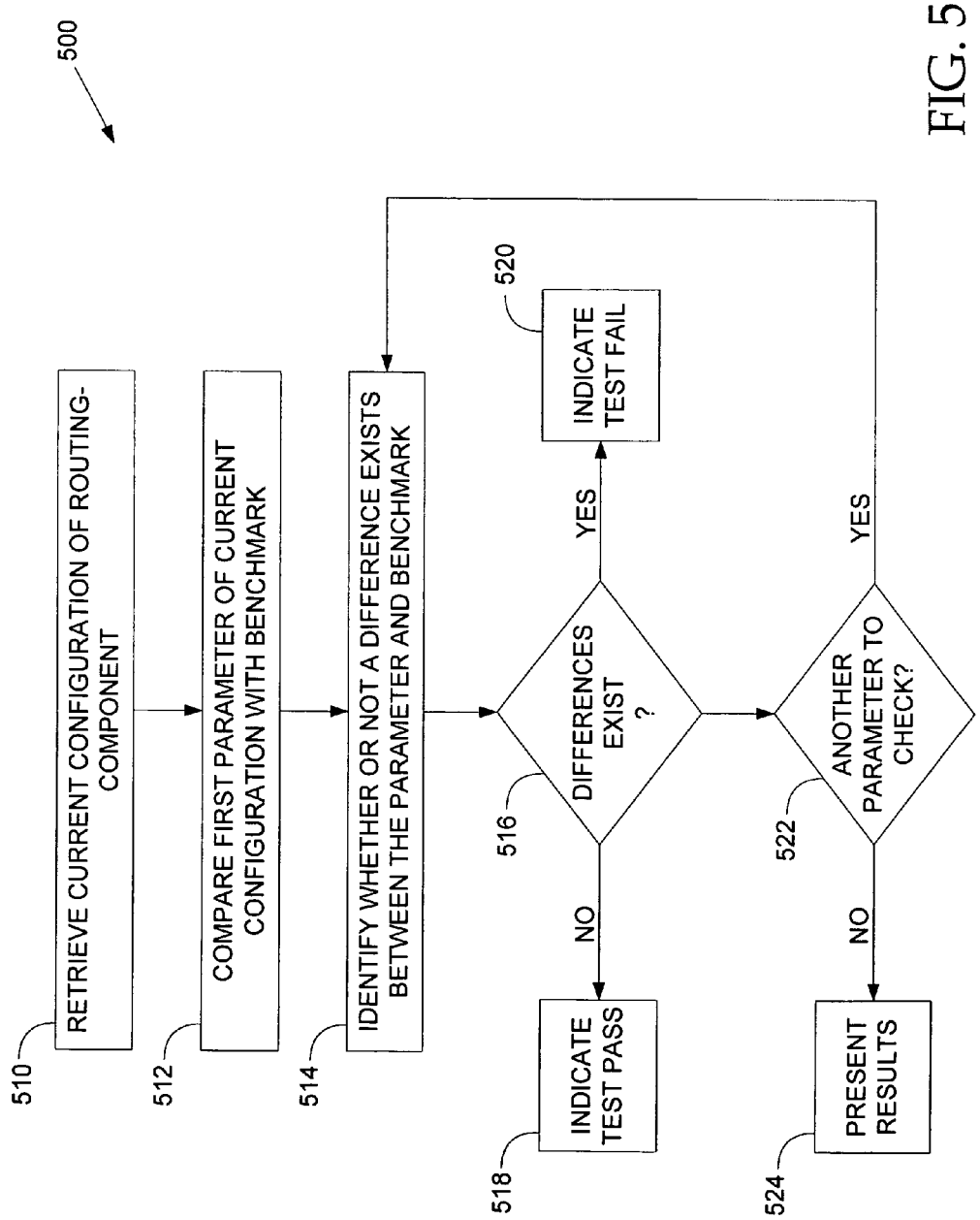
FIG. 5 is a flowchart depicting the compare process in greater detail according to an embodiment of the present invention.

Referring now to FIG. 5, a flowchart is provided depicting the compare process in greater detail according to an embodiment of the present invention and referenced generally by the numeral 500. At a step 510, the first parameter of the current configuration of the routing component is obtained. At a step 512, this parameter is read and compared against the equivalent benchmark parameter. At a step 514, a determination is made as to whether any differences exist. At a step 516, the result of such comparison is indicated. At a step 522 a determination is made as to whether there are additional parameters within the current configuration of the routing component. If so, the next parameter is submitted at step 514 and the process continues. If, however, no additional parameters need to be compared then at a step 524, the results are presented.

The benchmark configuration contains the correct parameters that should make up the routing component's configuration. That is, the benchmark set of parameters contains the data corresponding to the desired configuration that should appear in the routing component. The parameters in the benchmark set of parameters are deemed to be correct. The benchmark configuration provides a basis for determining whether the parameters in the current configuration of the routing component are correct.

FIG. 6 depicts an exemplary depiction of an illustrative report that can be presented, and is referenced generally by the numeral 600. In an embodiment of the present invention, an identifier, such as the name of the user initiating the quality assurance test on a routing component, may be listed along with the date and time of the test. The following information is merely illustrative and provided in connection with the example of FIG. 6.

Identifier 612 denotes upon which routing component a test was run. Identifier 612 may take on many forms (as shown, an IP address, other name, etc.). Region 614 is an illustrative example of how the results of a quality-assurance test may be presented. As shown, some tests pass, and some fail. For example, CRC check 614A failed; and the user is prompted to clear the counters and retest after some interval such as 10 minutes. An illustrative LOS check 616 presents the user with a message stating that the current IOS is not among a set of approved IOSs.

Message 616 prompts the user to visit a specific website for further instruction, as indicated by 616A. An illustrative example of a summary report 618 indicates that the quality assurance of the routing component in question has failed. In one embodiment, a test that has passed is indicated by the text "OK," and a test that has failed is indicated by the text "FAIL." But one with ordinary skill in the art will appreciate that an indication to a user that a certain test has passed or failed is not limited to text. In another embodiment, the depiction of whether or not a specific test has passed or has failed may be represented by certain colors; one color indicating that a test passed, while another color indicating that the test failed. In still another embodiment, the depiction of a pass or fail may be represented by symbols, blink, etc.

The illustrative report of FIG. 6 may take many forms. The format of how the data is shown is not as important as the fact that the data is shown in an easily readable way. Many formats are contemplated within the scope of the claims below.

As can be seen, the present invention and its equivalents are well adapted to provide a new and useful method for, among other things, quality assuring the configuration of routing components. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included due to the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of ensuring that data is properly routed through a communications network, the method comprising:
   confirming, without user interaction, that a set of one or more routing components associated with said communications network is properly configured, wherein said confirming includes:
   (A) determining a routing component of said routing components to check;
   (B) running a script that establishes a remote terminal session with the routing component;
   (C) automatically, by way of the script,
       (i) commanding the routing component to save the currently-running configuration of the routing component to nonvolatile memory;
       (ii) commanding the routing component to disable paging of output responses; and (iii) querying said routing component for a set of the currently-running configuration parameters of said routing component saved in nonvolatile memory and retrieving from the routing component the set of currently-running configuration parameters;

(D) comparing said retrieved set of currently-running configuration parameters against a benchmark set of configuration parameters that contains desired configuration parameters for the routing component; and (E) indicating differences between said retrieved set of currently-running configuration parameters and said benchmark set of configuration parameters.

2. The media of claim 1, wherein said querying comprises:
providing a set of commands that determine a configuration associated with said routing component; and
saving said configuration.

3. The media of claim 1, wherein comparing said retrieved set of current configuration parameters against said benchmark set of configuration parameters comprises identifying any differences between said retrieved set of current configuration parameters and said benchmark set of configuration parameters.

4. The media of claim 3, wherein said benchmark set of configuration parameters comprise an expected set of configuration parameters.

5. The media of claim 1, further comprising repeating steps A-E for as many routing components as are in said set.

6. The media of claim 1, further comprising presenting a set of results associated with said comparison.

7. One or more non-transitory computer-readable media having computer-useable instructions embodied thereon for performing a method of automatically ensuring that a routing component is configured as desired in a communications network, the method comprising:
providing one or more reference data sets containing desired routing-component configuration parameters;

(A) running a script that establishes a remote terminal session with one or more routing components in the network;

(B) automatically, by way of the script,
(i) commanding the one or more routing components to save one or more currently-running configurations of the one or more routing components to nonvolatile memory;
(ii) commanding the one or more routing components to disable paging of output responses;
(iii) retrieving the one or more currently-running configurations that comprise currently-running configuration parameters of the set of one or more routing components in the network;

comparing the one or more reference data sets with the one or more currently-running configurations; and identifying differences between the one or more reference data sets and the one or more currently-running configurations.

8. The media of claim 7, wherein retrieving said one or more currently-running configurations comprises:
executing a list of commands that determines said current currently-running configuration parameters from said one or more routing components.

9. The media of claim 7, further comprising presenting results of said comparison on a user interface.

* * * * *